(12) United States Patent
Tock

(10) Patent No.: US 6,223,346 B1
(45) Date of Patent: Apr. 24, 2001

(54) COMPUTER PROGRAM PRODUCT HAVING PRELOADED SOFTWARE MODULE

(75) Inventor: Theron D. Tock, Sunnyvale, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/416,285

(22) Filed: Oct. 12, 1999

Related U.S. Application Data

(62) Division of application No. 09/131,686, filed on Aug. 10, 1998, now Pat. No. 5,966,542, which is a division of application No. 08/655,474, filed on May 30, 1996, now Pat. No. 5,815,718.

(51) Int. Cl.$^7$ ........................................... G06F 9/445
(52) U.S. Cl. ........................... 717/11; 717/1; 713/1; 713/2
(58) Field of Search ............................ 717/1, 2, 3, 10, 717/11; 713/1, 2, 100; 707/103

(56) References Cited

U.S. PATENT DOCUMENTS

| | | | |
|---|---|---|---|
| 5,051,893 | * | 9/1991 | Tenny et al. ........................ 395/708 |
| 5,303,380 | * | 4/1994 | Tenny et al. ........................ 395/710 |
| 5,317,723 | * | 5/1994 | Heap et al. ............................. 713/2 |
| 5,355,489 | * | 10/1994 | Bealkowski et al. .................... 713/2 |
| 5,369,766 | * | 11/1994 | Nakano et al. ....................... 709/305 |
| 5,450,489 | * | 9/1995 | Ostrover et al. ......................... 380/3 |
| 5,535,409 | * | 7/1996 | Larvoire et al. ..................... 713/202 |
| 5,574,915 | * | 11/1996 | Lemon et al. ....................... 712/220 |
| 5,594,903 | * | 1/1997 | Bunnell et al. ..................... 395/712 |
| 5,613,120 | * | 3/1997 | Palay et al. ......................... 395/710 |
| 5,664,128 | * | 9/1997 | Bauer .................................. 345/334 |

(List continued on next page.)

FOREIGN PATENT DOCUMENTS 2 242 293    9/1991   (GB) .

OTHER PUBLICATIONS

Java Intermediate Bytecodes, Gosling. ACM SIGPLAN Workshop on Intermediate Representations, pp. 111–118 (1995).

Java Spills Into the Mainstream—Sun Sees Add Program Spec as Boost to all Applications, Wilder et al. Informationweek, p. 21 (1996).

Next Box Specs Nailed, Richman, Computerworld, vol. 30 No. 21, pp.1, 12, (1996).

Network Computers: Sun's Java is Native Language, Issacson, Computer Reseller News, p. 65 (1996).

(List continued on next page.)

*Primary Examiner*—Kakali Chaki
(74) *Attorney, Agent, or Firm*—Pennie & Edmonds LLP

(57) ABSTRACT

A method and system for providing an executable module having an address space for storing program data that is to reside in a read-only storage medium and an address space for storing program data that is to reside in a random access memory is herein described. The executable module represents Java classes that are structured for dynamic class loading. A static class loader is used to modify the class structure to accommodate static loading. The static class loader also identifies methods that contain unresolved symbolic references and data that varies during the execution of the module. These methods and data are identified in order to place them in the address space that resides in the random access memory. The static loader is beneficial in a distributed computing environment having a client computer that has little or no secondary storage thereby requiring applications to run entirely in random access memory. By utilizing a read-only memory to store statically loadable classes, the random access memory is left available for other uses.

7 Claims, 12 Drawing Sheets

U.S. PATENT DOCUMENTS

| | | | | |
|---|---|---|---|---|
| 5,671,356 | * | 9/1997 | Wang | 709/222 |
| 5,671,413 | * | 9/1997 | Shipman et al. | 713/2 |
| 5,848,296 | * | 12/1998 | Suzuki | 710/10 |
| 5,966,542 | * | 10/1999 | Tock | 395/712 |

OTHER PUBLICATIONS

Gosling, "Java Intermediate Bytecodes", ACM SIGPLAN Wrkshop on Intermediate Representations, 1995, pp.111–118.*

Wilder et al., "Java Spills Into the Mainstream—Sun sees added program spec as boost to all applications", Informationweek, Feb. 1996, p. 21.*

Richman, "'net box specs nailed", Computerworld, vol. 30 No. 21, 1996, pp. 1, 12.*

Isaacson, "Network "computers": Sun's Java is native language", Computer Reseller News, Mar. 1996, start p. 65.*

* cited by examiner

|  | 0 | 7 | 8 | 15 | 16 | 23 | 24 | 31 |
|---|---|---|---|---|---|---|---|---|
| Word 1 | opcode | | operand | | opcode | | operand | |
| Word 2 | operand | | opcode | | operand | | operand | |

FIG. 7

COMPUTER PROGRAM PRODUCT HAVING PRELOADED SOFTWARE MODULE

This applications is a division of application Ser. No. 09/131,686 filed Aug. 10, 1998 now U.S. Pat. No. 5,966,542, which is a division of U.S. patent application Ser. No. 08/655,474, filed May 30, 1996, now U.S. Pat. No. 5,815,718.

The present invention relates generally to object-oriented computer systems having classes that are dynamically loaded at runtime, and particularly to a system and method for preloading a subset of the classes in a read-only memory.

BACKGROUND OF THE INVENTION

A current trend in object-oriented programming languages is to extend the functionality of the language to accommodate the distribution of dynamic content in a distributed computing environment. In one such language, this is accomplished by dynamically loading classes at runtime. A class is a collection of variables and methods that model the behavior of an object. By dynamically loading classes at runtime, existing applications can add functionality by linking in new classes that reside on any computer system within the distributed computing environment.

In such languages, symbolic references are used to refer to the class members (i.e., the class' methods and variables). When a class is invoked, the dynamic loader determines the storage schema for the class and resolves the symbolic reference. Such a loading scheme is beneficial when accessing classes that are updated often. However, a limitation of such a loading scheme is its dependency on a read/write memory device such as a random access memory (RAM). In a computing environment that has little or no secondary storage (e.g., non-volatile magnetic disk storage), dynamic loading of the classes in this manner can quickly use up the storage capacity of the RAM. As the capacity of the RAM is limited, it is desirable to minimize the amount of RAM that is used by an application. Accordingly, there exists a need to limit the amount of RAM that is utilized to execute object-oriented program code having dynamically loadable classes.

It would be beneficial to provide a method and system which overcomes the deficiencies of the prior art.

SUMMARY OF THE INVENTION

In summary, this disclosure pertains to an offline class loader that is used to produce an executable module whose classes are preloaded into memory without requiring runtime dynamic loading. The executable module, nevertheless, contains a class structure that is tailored for runtime dynamic loading. Thus, the offline class loader modifies the existing class structures to accommodate static loading. However, the class structure allows for varying data and methods that contain unresolved references. The offline class loader tags these methods and data specifying that they are to be stored in a random access memory. All other data is stored in a read-only memory. At the completion of the static loading process, a preloadable executable module is generated that contains two addresses spaces. A first address space that contains methods having unresolved references and data that varies during the execution of the module is loaded in a random access memory. The second address space contains methods having static loaded classes and constant data which is loaded into a read-only memory.

A preloadable executable module of this fashion is advantageous in a distributed computer system having client computers with little or no secondary storage. Such client computers require applications to run entirely in random access memory which quickly turns into a limited resource. By utilizing the offline class loader to partition an application into two address spaces, the amount of RAM utilized by the preloadable module is minimized.

In an embodiment, a client computer having minimal secondary storage utilizes an offline class loader to preload a browser in the client's read-only memory. The browser is partitioned into the aforementioned two address spaces. At system initialization or power up, the random access memory portion of the browser is loaded from read-only memory into the random access memory. By executing a large portion of the browser from read-only memory, the browser has additional RAM storage to store information-content and executable modules that it can obtain from other server computers that the client is in communication with.

BRIEF DESCRIPTION OF THE DRAWINGS

Additional objects and features of the invention will be more readily apparent from the following detailed description and appended claims when taken in conjunction with the drawings, in which:

FIG. 7 illustrates an instruction bytecode stream.

DESCRIPTION OF THE PREFERRED EMBODIMENTS

Figure 1:
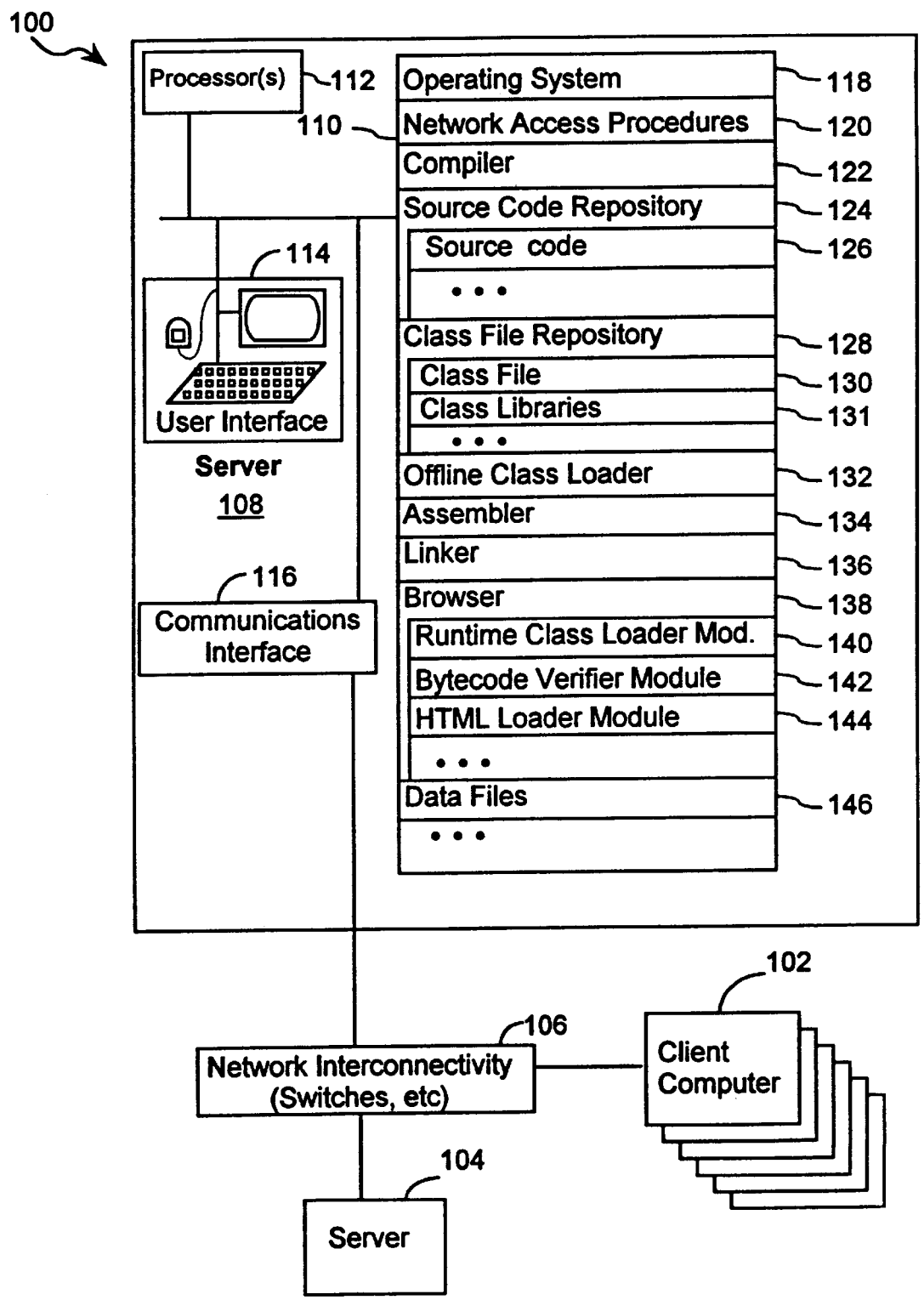
FIG. 1 is a block diagram of a distributed computer system.

The method and system described herein utilizes a distributed computing environment having a communication link that connects at least one server computer and a number of client computers. Some of the client computers have little or no secondary storage (e.g., non-volatile magnetic disk storage) thereby requiring applications to be run entirely from random access memory. An application developed in the Java programming language is executed on such a client computer. Preferably, the application is a browser that is used to import Java content, such as Java applets, from one or more server computers. Typically, the browser is an interpreted program module that retrieves Web documents utilizing a HyperText Transfer Protocol (HTTP) to access one or more Web pages formatted as HyperText Markup Language (HTML) documents from a server acting as a Web site. The HTML documents are interpreted and presented to the user associated with the client computer. Often, the HTML documents embed applets. An applet is a executable module represented as a Java class. The browser loads in the applet and its associated classes in order to execute the applet.

The browser, the HMTL documents, and the applets all reside in the computer's RAM. On occasion, the amount of data that is loaded into RAM may exceed its capacity. As the client computer may have no secondary storage, it is advantageous to place portions of the browser and other basic support classes in a read-only memory. In this manner, RAM storage is preserved particularly for the imported applets. Preferably, the browser and other basic support classes (e.g., I/O and utility classes) are preloaded in a read-only memory.

The offline class loader partitions a Java application, such as the browser and the basic support classes, into at least two separate address spaces. A first address space resides in a read-only memory device and contains methods that do not require dynamic loading and data that remains constant. The second address space resides in a read/write memory device, such as random access memory, and contains methods that require dynamic loading and data that is varied during execution.

A browser partitioned in this manner can be initially stored in the read-only memory of the client computer. When the system powers on, the second address space is preloaded into the RAM. This will leave a large amount of RAM storage for use by the browser to import HTML documents, applets, other information-context, and executable modules that are accessible through the communications link It should be noted that this disclosure is described with reference to the Java programming language. For this reason, this description will utilize the nomenclature of Java. The following Java nomenclature is used frequently throughout the description and will be described herein briefly. A class is a grouping of instance variables and methods that is used to describe the behavior of an object. An object is an instance of a class. An instance variable is the data of an object that is instantiated from a class. A static instance variable is one that will be the same for all instances of the class. A non-static instance variable varies for each instance of the class. Constant data refers to data that is not altered during program execution.

A method is a program segment that performs a well-defined series of operations. In Java, a method is implemented by instructions represented as a stream of bytecodes. A bytecode is an 8-bit code that can be a portion of an instruction such as an 8-bit operand or opcode. An interface is an abstract class where the bytecodes that implement the method are defined at runtime. A Java application is an executable module consisting of bytecodes that can be executed using the Java interpreter or the Java just-in-time compiler. A more detailed description of the features of the Java programming language is described in Tim Ritchey, *Programming with Java Beta* 2.0, New Riders Publishing (1995).

Referring to FIG. 1, there is shown a distributed computer system 100 having multiple client computers 102 and multiple server computers 104. In an embodiment, each client computer 102 is connected to the servers 104 via the Internet 106, although other types of communication connections could be used. Preferably, the server and client computers can be desktop computers, such as Sun workstations, IBM compatible computers and Macintosh computers, however, virtually any type of computer can be a server or client computer. Furthermore, the system is not limited to a distributed computer system. It may be practiced without the specific details and may be implemented in various computer systems and in various configurations, or makes or models of tightly-coupled processors or in various configurations of loosely-coupled microprocessor systems.

In an embodiment, one or more server computers act as Web sites containing a repository of HTML documents containing Java content or applets. The client computer executes a browser that provides a user associated with the client computer with access to the HTML documents available from the server computer. Referring to FIG. 1, a server computer typically includes one or more processors 112, a communications interface 116, a user interface 114, and memory 110. Memory 110 stores:

- an operating system 118;
- an Internet communications manager program or other type of network access procedures 120;
- a compiler 122 for translating source code written in the Java programming language into a stream of bytecodes;
- a source code repository 124 including one or more source code files 126 containing Java source code;
- a class file repository 128 including one or more class files 130, and one or more class libraries 131 containing class files, each class file containing the data representing a particular class;
- an offline class loader 132 which is used to preload a certain set of classes; the offline class loader can also be referred to as a static class loader;
- an assembler 134 which produces an object file representing the class members, class data structures, and memory storage indicators in a format that is recognizable for the linker;
- a linker 136 for determining the memory layout for a set of preloaded classes and for resolving all symbolic references;
- a browser 138 for use in accessing HTML documents; and
- one or more data files 146 for use by the server.

The browser can include:

- a runtime time class loader module 140, which loads classes into a user's address space and utilizes the bytecode program verifier to verify the integrity of the methods associated with each loaded class;
- a bytecode program verifier module 142 for verifying whether or not a specified program satisfies certain predefined integrity criteria; and
- a HTML loader 144 for loading HTML documents; as well as other modules.

Figure 2:
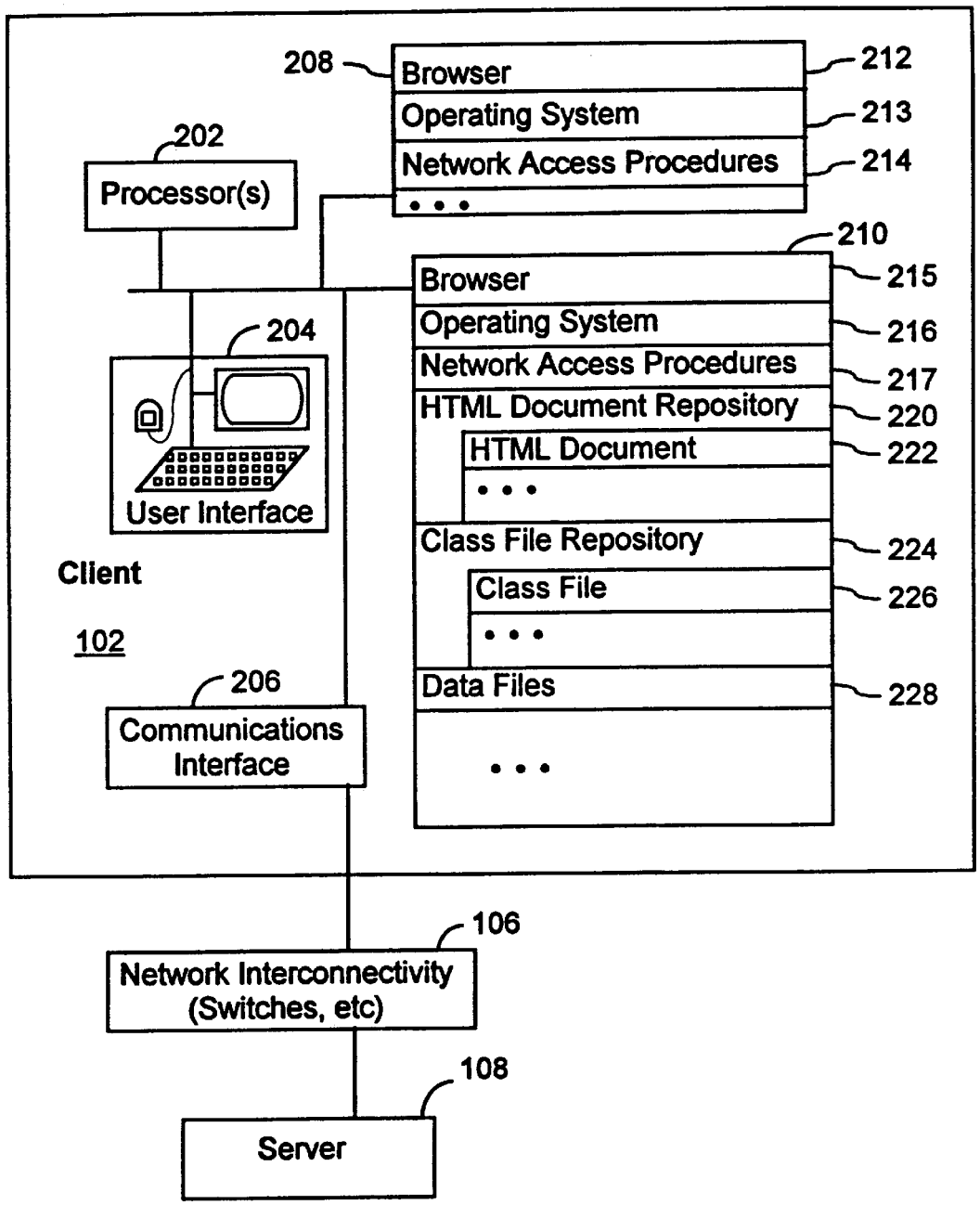
FIG. 2 is a block diagram of a client computer in the distributed computer system of FIG. 1.

FIG. 2 illustrates the client computer that includes one or more processors 202, a communications interface 206, a user interface 204, a read-only memory 208 and a random access memory 210. The read-only memory 208 stores a portion of the browser 212 and support procedures (including an operating system 213 and network access procedures 214) that contain methods having no unresolved references and data that remains constant. The random access memory 210 stores:

- a second portion of the browser 215 and support procedures 216, 217 that contains methods having unresolved references and data that is altered during the application's execution;
- a HTML document repository 220 containing one or more HTML documents 222 obtained by the browser at the request of the user through the user interface 204;

a class file repository 224 containing one or more class files or applets 226; and one or more data files 228 that the client may utilize during its processing.

Figure 3:
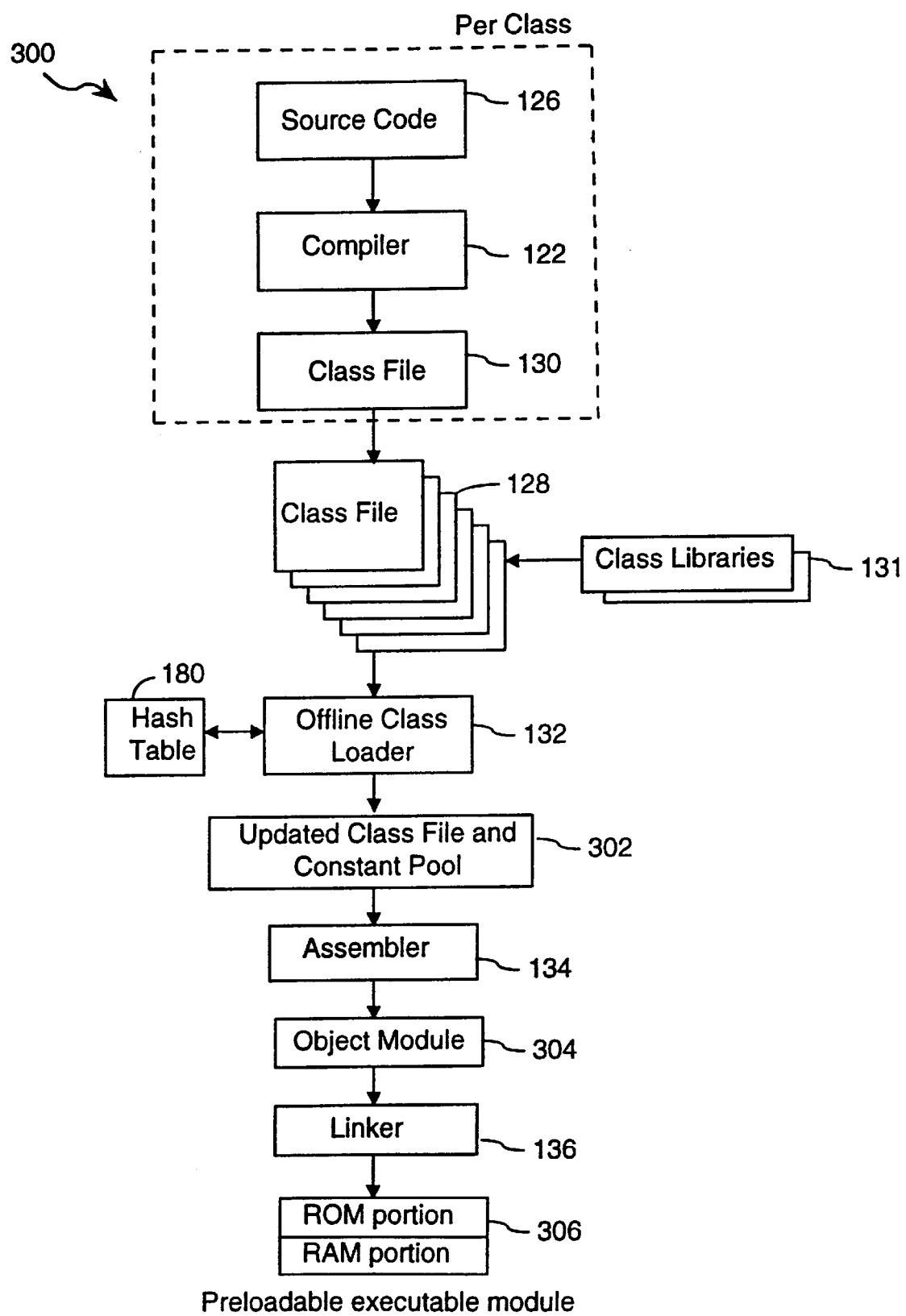
FIG. 3 is a flow diagram illustrating the processing components used to produce the preloadable executable module.

FIG. 3 is an overview illustrating the sequence of steps used to produce a preloadable executable module. It should be noted that the method and system described herein pertains to preloading the browser and other support procedures. However, the method and system described herein is not limited to these particular Java applications. Any Java application, or any other set of methods that are normally linked at run time could be preloaded using the method and system described herein.

The source code 126 for each class that comprises the Java application is compiled by compiler 122 into a class file 130. The class file contains class data structures representing the classes, each method's bytecodes, constant data, as well as other information. A more detailed description of the class file is provided below. Alternatively, the class files corresponding to the application can already reside in one or more class libraries 131. Once the class files are available, the entire set of class files 128 that constitute an application to be preloaded are transmitted to the offline class loader 132.

The goal of the offline class loader 132 is to determine which methods and variables associated with each class can be stored in a read-only memory and which must be stored in a random access memory device. Methods that invoke Java interfaces or utilize non-static instance variables need to reside in random access memory. This is because the bytecodes that implement interfaces are determined at runtime and non-static instance variables are altered for each instantiation of the associated class. The offline class loader 132 finds these methods and variables and flags them by inserting a special indicator that specifies that they are to be loaded in a random access memory device. The offline class loader also performs a number of optimizations in order to produce a more compact representation of the executable code. For example, the constant pool that is associated with each class is combined for all the classes residing in the application. In addition, the offline class loader performs additional processing to tailor the class files that were originally structured for dynamic loading for a preloaded class environment.

The output of the offline class loader 302 can consist of two files: a constant pool file containing the constant data for the entire application; and an updated class file containing the class data structures and class members. The data in both of these files is formatted as data definitions, where each definition specifies a bytecode and an offset indicating a memory location. The updated class file will include the memory storage indicators which will indicate in which type of memory storage device a particular set of bytecodes is to reside. However, the method and system described herein is not limited to producing these two files. Other file configuration can be used including, but not limited to, a single file containing all the related class data.

The files are then transmitted to an assembler 134 which produces an object module having the required format for the linker to map the data into the appropriate address spaces. Preferably, there will be two address spaces, one for a random access memory device and a second for read-only memory device. The object module is then transmitted to the linker 136 which generates a memory layout for the classes in the application. Once the memory layout is determined, the linker 136 resolves all symbolic references and replaces them with direct addresses. The memory layout is partitioned into the two addresses spaces. The methods and data that were flagged for read-only memory are included in the first address space and the methods and data that were flagged as requiring storage in a random access memory are included in a second address space. The output from the linker 136 is a preloadable executable module 306 containing the methods and data for these two address spaces.

The main function of the offline class loader as noted above is to determine the methods and data that are to be stored in a read-only memory and those that are to be stored in a random access memory. In addition, the constant pool for all the preloaded classes are preferably combined by the offline class loader, thereby minimizing the amount of read-only storage utilized. In order to combine the constant pools, certain optimizations are performed to reduce the amount of storage that is used. Specifically, duplicate expressions are eliminated and strings that are part of longer strings are replaced with pointers to the appropriate substring positions in the longer string.

The universal constant pool, containing all the classes, is partitioned into two segments, the first segment spanning 256 bytes and the second segment spanning 64 k minus 256 bytes. The first segment can contain at most 256 constants and the second segment contains the remaining constants. The constant pool is ordered such that the most frequently referenced constants are stored in the first segment of the pool and the least frequently referenced constants are stored in the second segment. Once the constant pool is combined, bytecodes that reference the constants may need to be adjusted. Constants in the first segment are referenced by an 8-bit operand whereas constants in the second segment are referenced by two 8-bit operands (see FIG. 7 where operand 702 is an 8-bit operand and operands 704 and 706 together form a 16-bit operand). The expansion from an 8-bit operand to a 16-bit operand requires adjusting those bytecodes that reference constants in the second segment of the universal constant pool, as well as adjustment of bytecode offset values (e.g., in branch instructions) in the methods to account for the changed relative positions of the bytecodes in those methods. In addition, the alteration of the bytecodes requires updating the offsets stored in the exception table to reflect the changed bytecode start and end positions within the methods to which various exception handlers are assigned.

Further, the offline class loader performs two other transformations in order to tailor the class structure to one suited for preloading classes. A static class initializer is created, which performs class initialization for the classes that are preloaded. Also bytecodes using a non-quick instruction format that symbolically reference methods are recoded in a quick instruction format that references the methods directly.

Figure 4:
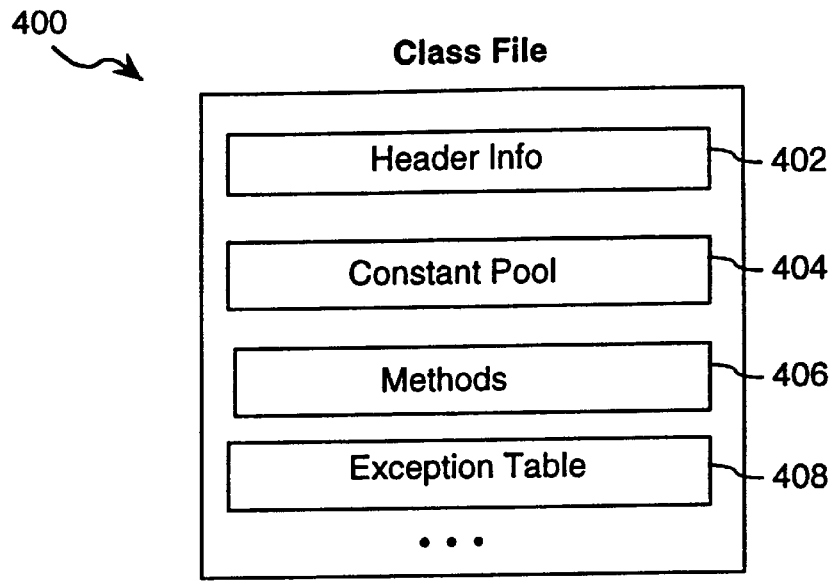
FIG. 4 illustrates the file layout for a class file.
Figure 8A:
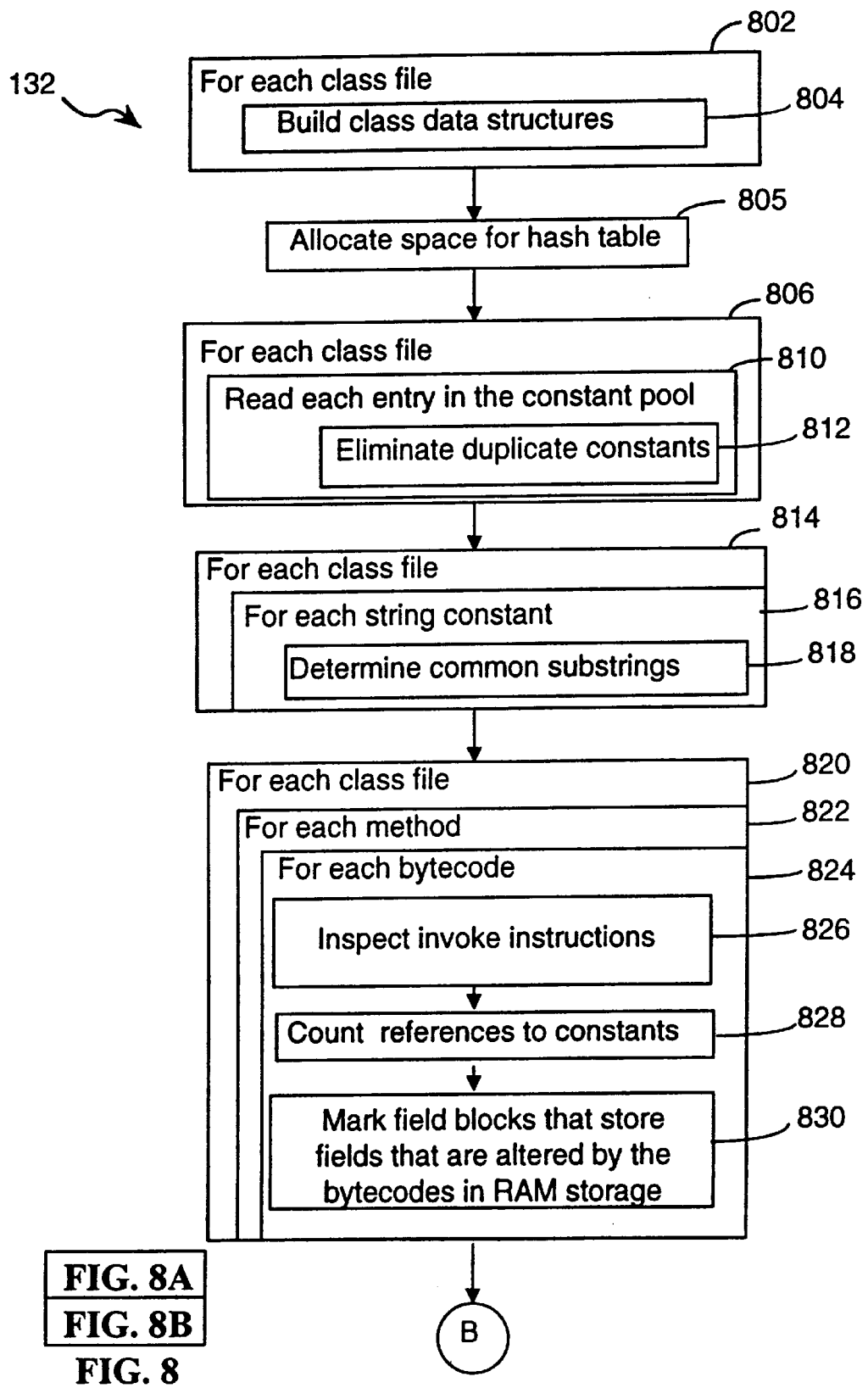
FIG. 8 is a flow chart of the method used by the offline class loader.
Figure 8B:
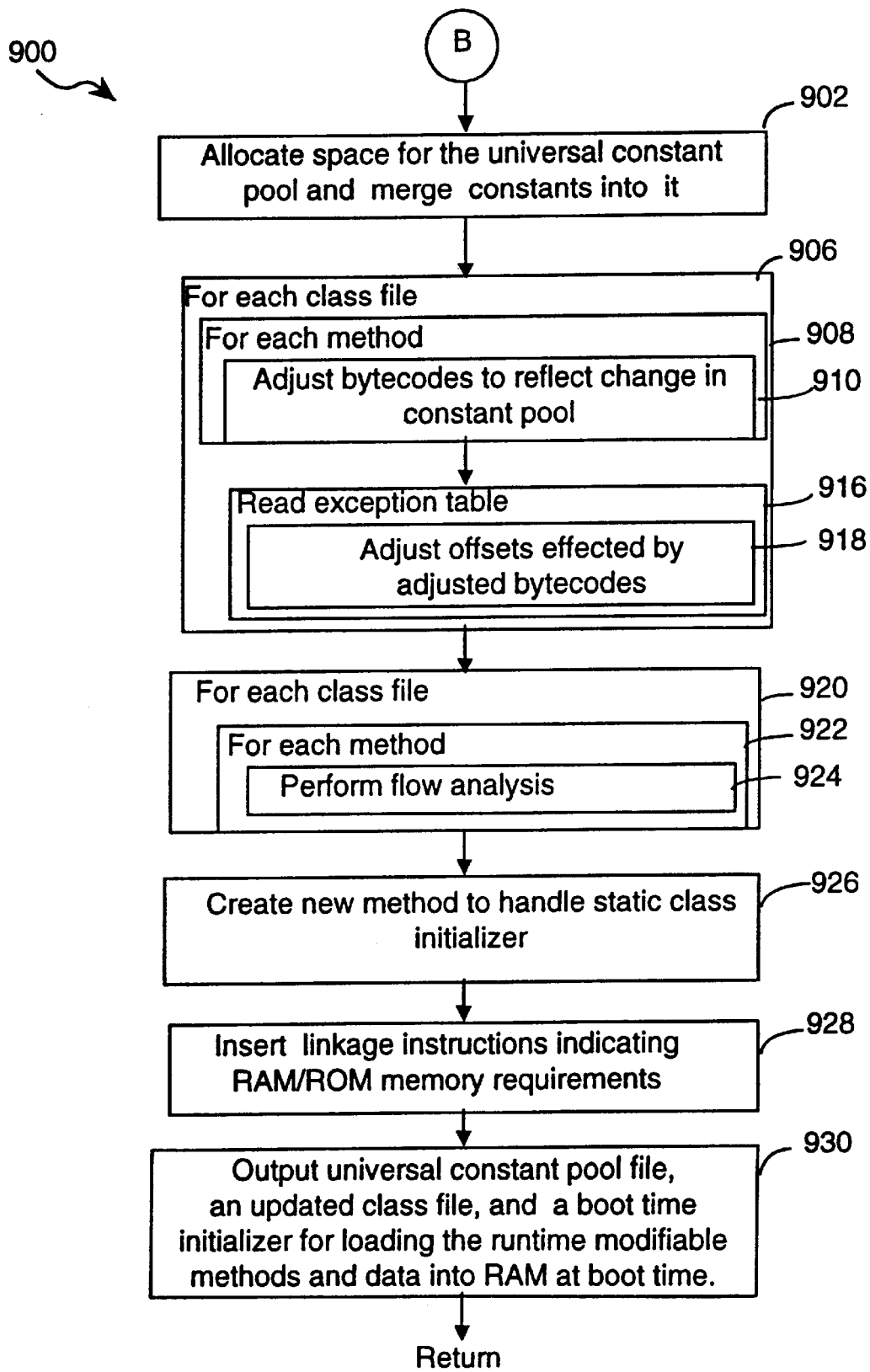

FIG. 8 illustrates in further detail the steps used by the offline class loader 132. Initially the offline class loader receives a class file for each class that is part of the application whose classes are to be preloaded. FIG. 4 illustrates a format for the class file. The class file contains one or more header records 402, a constant pool 404, one or more methods 406, and an exception table 408. The header records 402 can indicate the size of the constant pool, the number of methods, and the size of the exception table. The constant pool 404 includes data that remains unaltered during the execution of the application. Examples of such data can include string constants, static final integers, references to methods, references to classes, and references to interfaces. The method data 406 consists of a stream of bytecodes that implement each method. Each entry in the exception table gives a start and end offset into the bytecodes, an exception type, and the offset of a handler for the exception. The entry indicates that when an exception of the indicated type occurs within the code indicated by the starting and ending offsets, a handler for the exception will be found at the given handler offset.

Figure 6:
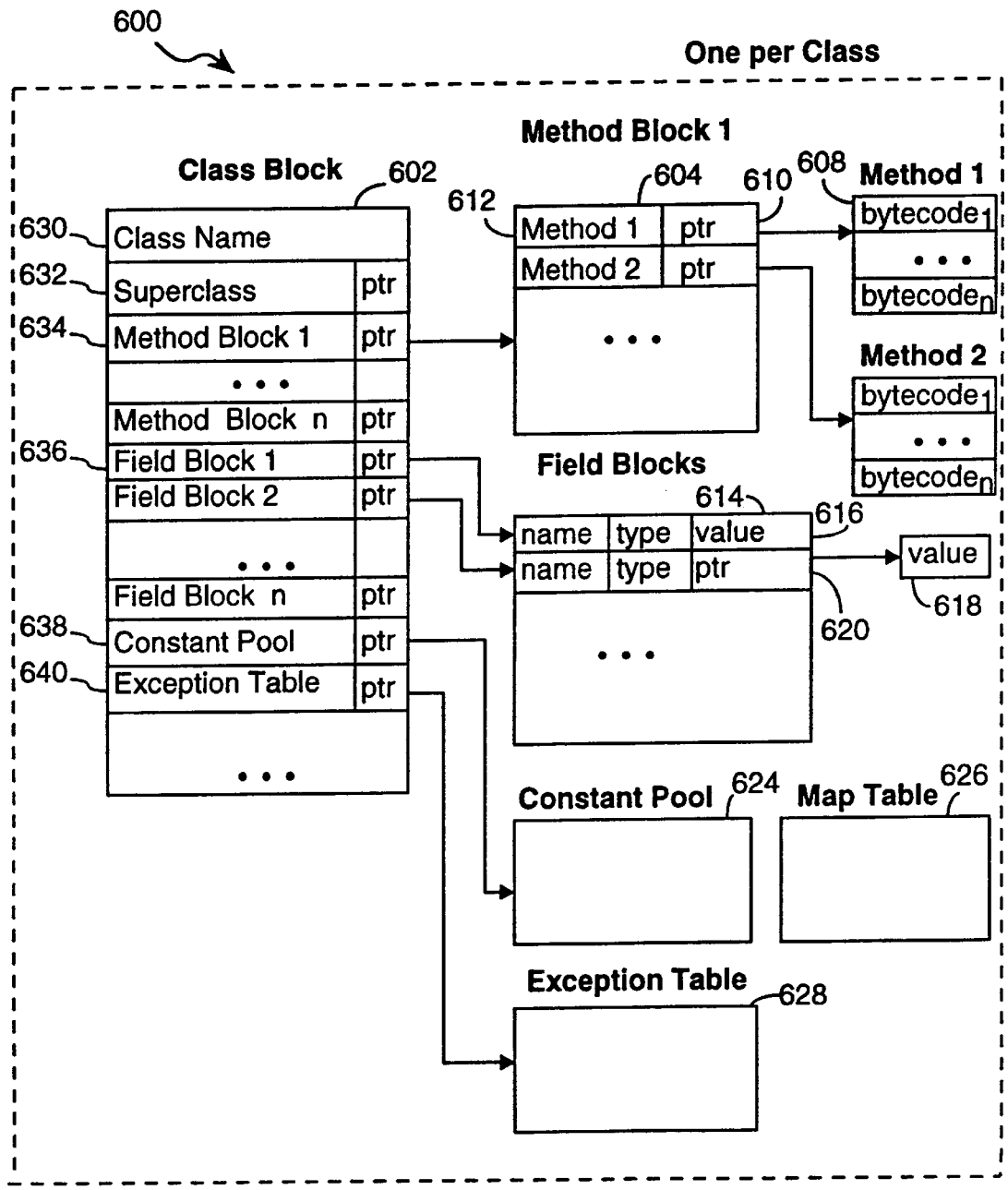
FIG. 6 illustrates the class block data structures.

Each class file is read by the offline class loader (step 802) and the appropriate class data structures for each class are built (step 804), that is stored in the memory of the computer being used to preprocess the application. FIG. 6 illustrates the class data structures 600. For each class there is a class block 602, one or more method blocks 604, bytecodes for each method 608, one or more field blocks 614, separate data areas for the fields 618, a constant pool 624, a map table 626 and an exception table 628.

The class block is a fixed-size data structure that can include the following data:
 the class name 630;
 a pointer 632 to the class block of the current class' immediate superclass;
 an array of one or more pointers 634, each pointer referencing a method block;
 an array of one or more pointers 636, each pointer referencing a field block;
 a pointer 638 to the class' constant pool; and
 a pointer 640 to the class' exception table.

A method block 604 is a fixed-sized data structure that contains a predetermined number of methods. One or more method blocks are allocated to contain all the methods of a class. A method block 604 contains the method's name 612 and a pointer 610 to the corresponding bytecodes 608.

A field block 614 is a fixed-size data structure that contains instance variables or fields. There is a different field block format for each of the two different types of instance variables provided in Java. The first format 616 is used for integer or floating point instance variables. This format 616 contains the name of the instance variable, the type (e.g. integer or floating point), and its value. The second format 620 is used for double or long type instance variables. This format 620 contains the name of the instance variable, the type (e.g., double or long) and a pointer to location of the value of the instance variable 618.

Figure 9:
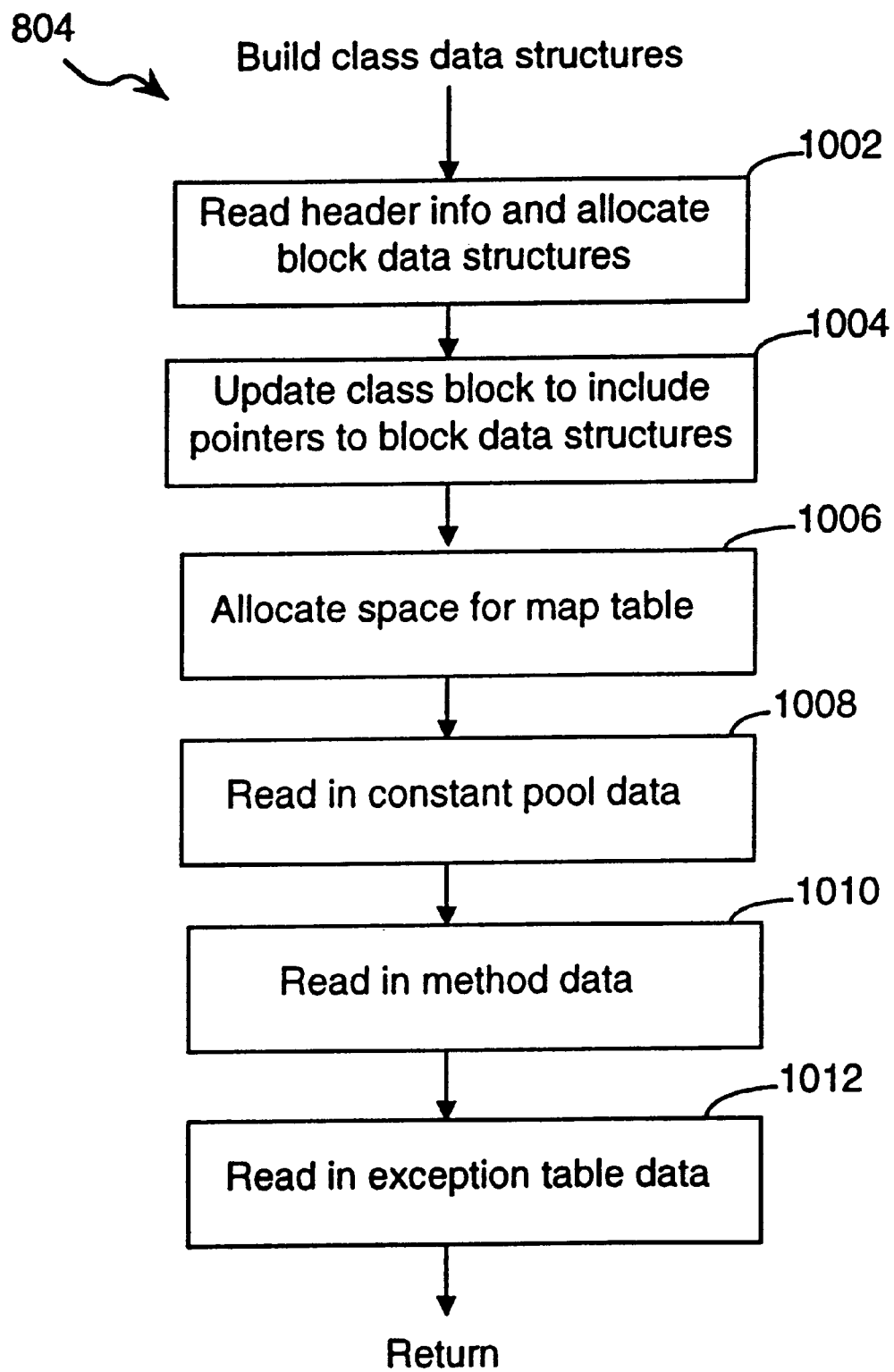
FIG. 9 is a flow chart of the method for building the class block data structures.

FIG. 9 illustrates the steps used to build the class data structures. The information in the header record is used to allocate space for each of the class data structures (step 1002). Once the class data structures are allocated, pointers to the location of each of these structures is included in the class block (step 1004).

Figure 5:
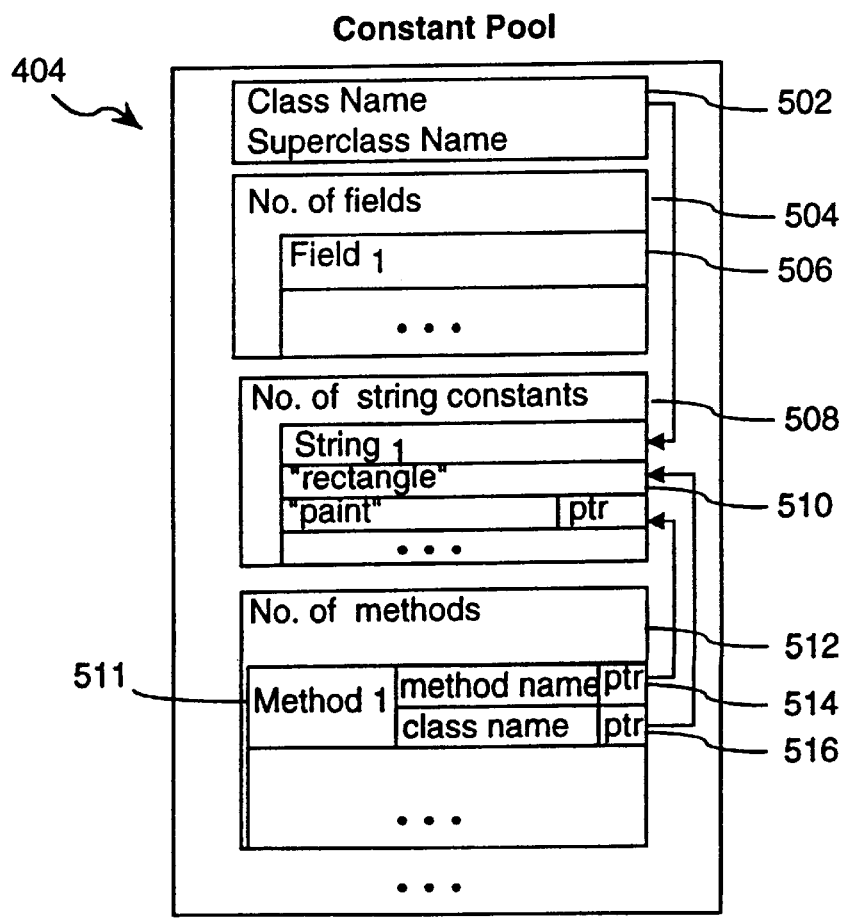
FIG. 5 illustrates the file layout for a constant pool.

Next, the offline class loader reads in the constant pool. Prior to discussing these steps, the content of the constant pool will be described first. FIG. 5 illustrates the structure of the constant pool that is stored in each class file. A first entry contains the name of the class and the name of the superclass 502. These names are stored as string constants and the first entry contains pointers to the locations of these strings in the constant pool. The next entry pertains to the fields or instance variables. A header 504 is used to denote the number of fields in the constant pool. The various fields 506 follow the header.

Likewise, the string constants are preceded by a header 508 that indicates the number of string constants in the constant pool. The various string constants 510 follow. String constants are used to denote method names, class names, and interface names. Next, the method references are stored in the constant pool preceded by a header indicating the number of methods 512. The constant pool contains for each method a method pointer 511 that contains a pointer to the method's name 514 and the method's class name 516. These names are stored as string constants in the constant pool. The method pointer 511 is used to symbolically reference a method. This is used in the non-quick format of an invoke method instruction.

A method can contain an instruction to invoke a method. The instruction in the non-quick format can be as follows:

$$\text{invoke method "class""method"} \quad (1)$$

where "class" refers to the string constant containing the class name and "method" refers to the string constant containing the method name. The invoke method instruction contains a pointer to the method's pointer 511. The offline class loader attempts to resolve this symbolic reference by adding to the method's name a pointer to the method's block. Once the linker has determined the memory layout for the classes, the linker replaces the non-quick format of the invoke method instruction by the quick format which directly references the method (i.e., by storing the method's address). By resolving the symbolic reference, the method can be preloaded.

Referring back to FIG. 9, storage is allocated for a map table 626 that will track the movement of the constants from their original location in the class file's constant pool to various temporary locations until the constants are stored in the universal constant pool. A map table 626 is created for each class and maps the original address of each constant in the constant pool to its current location (step 1006). All data contained in the constant pool except for the fields are read from the class file and stored in the constant pool (step 1008). As constants are transferred from the class file to the constant pool, the map table 626 is updated to reflect the original address and the current location in the constant pool (step 1008). However, the fields that are read from the constant pool are loaded into one or more field blocks and no entries are made for them in the map table (step 1008).

The method data is read from the class file and stored in one or more method blocks. Additional storage is allocated for the bytecodes associated with each method. The method's name is placed in the method block along with a pointer to the location of the bytecodes (step 1010). Likewise, the exception table is loaded from the class file into its corresponding exception table data structure (step 1012).

Referring back to FIG. 8, after the class data structures have been built, a hash table 180 (see FIG. 3) is allocated in accordance with the total size of all the constant pools and is used later in the elimination of duplicate constants (step 805).

Figure 10:
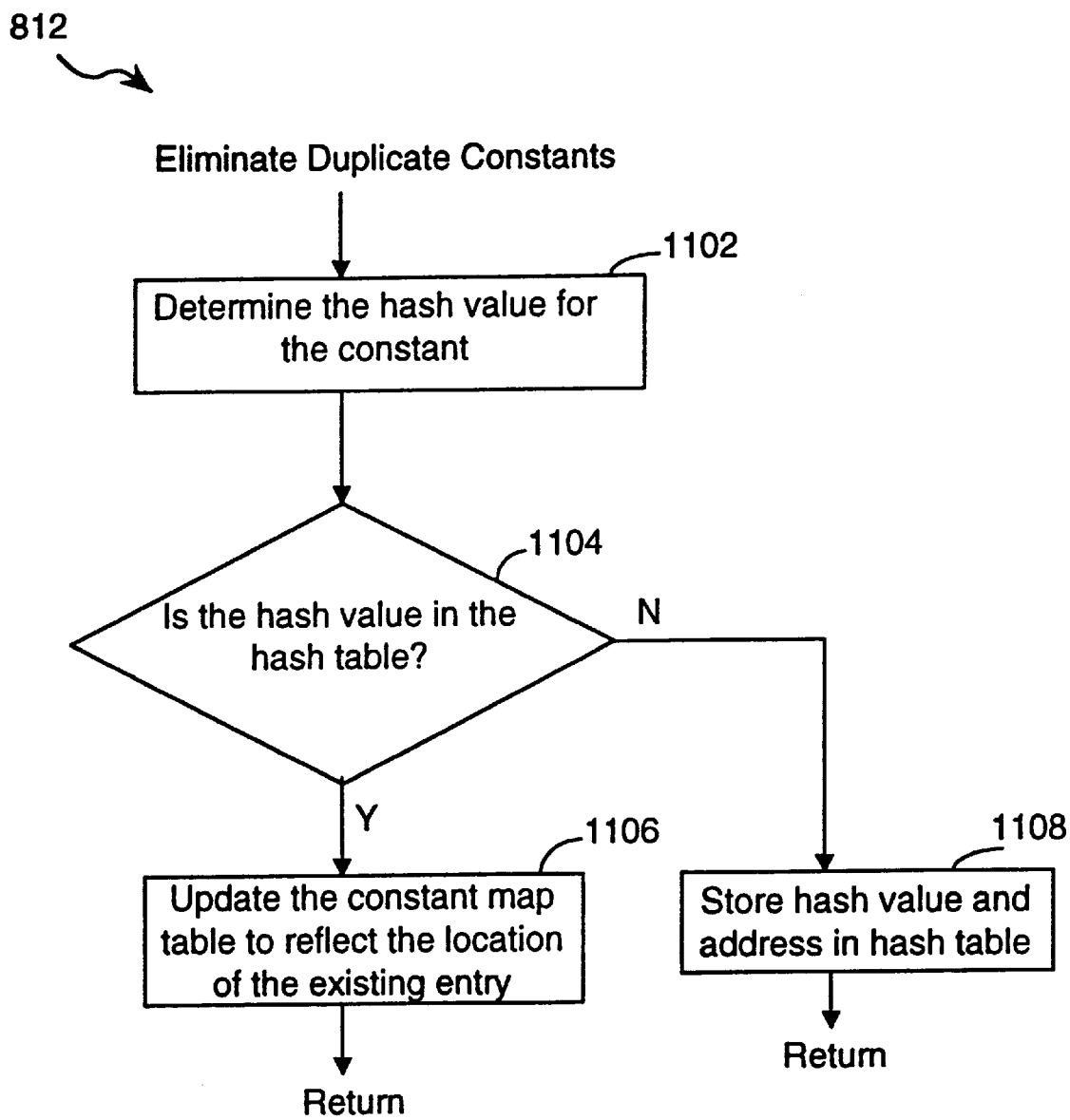
FIG. 10 is a flow chart of the method for eliminating duplicate constants.

Next, the offline class loader proceeds to eliminate duplicate constants. This is performed in order to combine the constant pools of all the classes in a space efficient manner. For each class file (step 806), each entry in the class' constant pool is scanned for duplicate constants (step 812). Referring to FIG. 10, duplicate constants are detected by using a hash table. The hash value of the constant is determined by an appropriate hashing function (step 1102). A check is made to determine whether the hash value is contained in the hash table (step 1104). If the hash value exists in the hash table, then the constant is a duplicate and the entry is deleted from the constant pool by altering the constant's entry in the map table to reflect the memory location of the existing constant (step 1106). Otherwise, the constant's hash value and memory location are stored in the hash table (step 1108).

Referring back to FIG. 8, the offline class loader proceeds to determine common substrings. A common substring is one that is contained as part of a longer string already stored in the constant pool. For each class file (step 814) each string constant is scanned to determine whether it is part of a larger string contained in the constant pool (step 816). This can be accomplished using one of several well-known string matching algorithms. When such a substring is found, it is replaced with a pointer to the position of the substring in the larger string (step 818).

Figure 11:
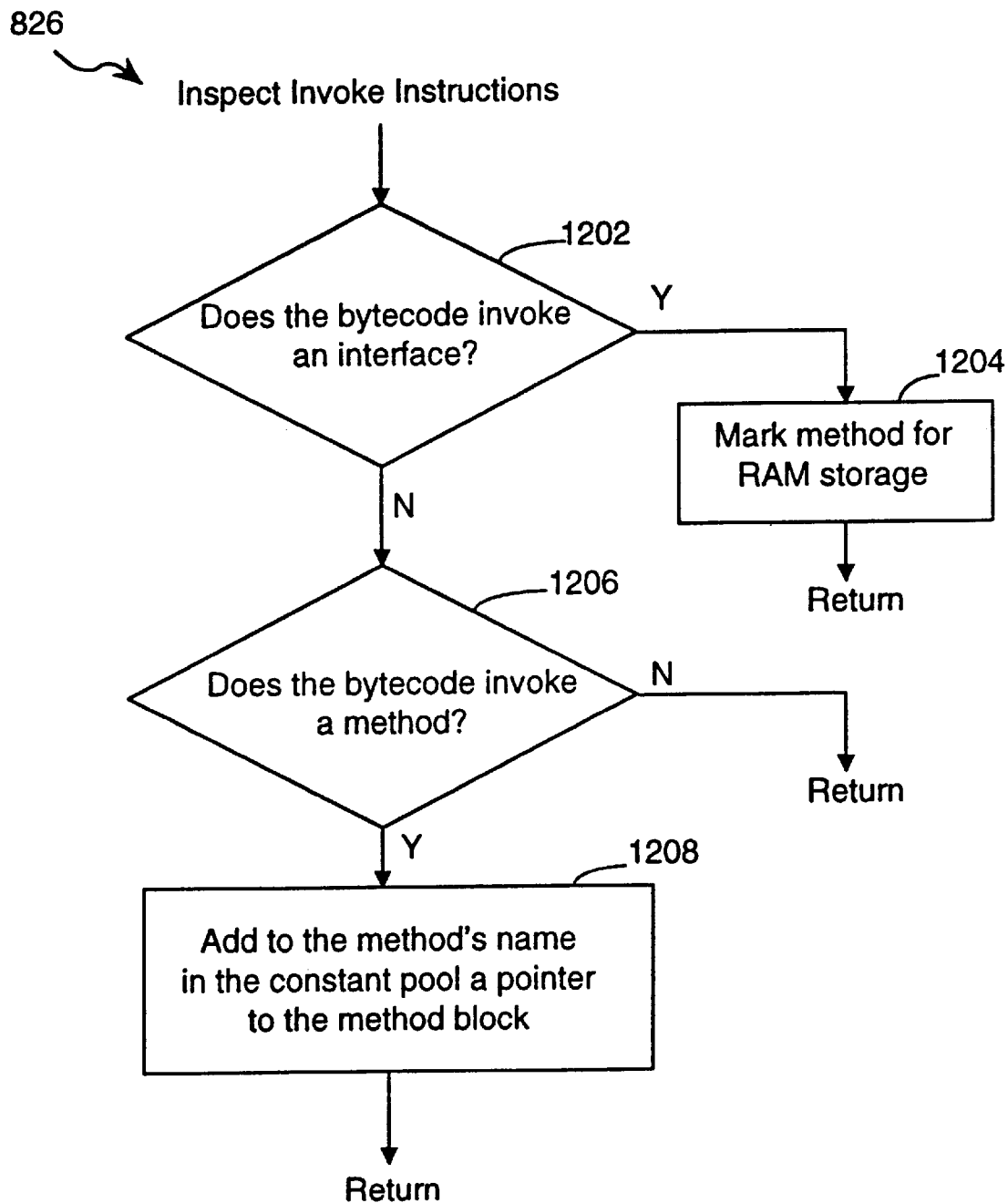
FIG. 11 is a flow chart of the method for converting a non-quick instruction format into a quick instruction format.

Next the offline class loader proceeds to scan the bytecodes of all the methods contained in each of the class files (steps 820–824). Referring to FIG. 11, the bytecodes are inspected for an invoke interface instruction (step 1202). A method having an invoke interface instruction is marked for RAM storage since the method being invoked by such an instruction will not be implemented until runtime (step 1204). Otherwise the bytecode is inspected for an invoke method instruction (step 1206). In this situation, a pointer 518 (see FIG. 5) to the method block containing the method to be invoked is added to the method's name that is stored in the constant pool (step 1208). Later when the linker has determined the memory layout of all the classes, the linker replaces the symbolic reference to the method with the direct address to the method. This is determined by tracing the method's name pointer to the method block that contains a pointer to the method.

As each bytecode is scanned, a reference count is made to each constant that is accessed by the bytecode (step 828). The reference count is an extra field that is contained in the map table. This will be used later to determine the most frequently used constants in order to reorder the constant pool. In addition, each bytecode is scanned for fields that are altered by the bytecode. This can be determined by checking if the field is ever used on the left hand side of an assignment statement. In this case, the field accepts a new value. If the altered field is one that has its value stored in the field block, than the entire field block is marked for RAM storage (step 830).

Once space is allocated for the universal constant pool, each entry from the various class constant pools is merged into the universal constant pool (step 902). As mentioned previously, the constant pool is partitioned into two segments. The first segment contains up to 256 of the most frequently referenced constants. The second segment contains the remaining constants. Constants that are never referenced are eliminated and not stored in the universal constant pool. The constant pool entries are read from each class' map table since the map table has the reference count, has eliminated duplicate entries, and has pointers to common substrings.

Once the universal constant pool is formed, bytecodes that reference constants stored in the second segment of the universal constant pool require a double length offset value, which occupies two bytes instead of one, to reference the constant. This requires scanning through each bytecode for each class' method (steps 906–908) and, for each bytecode referencing a constant in the second segment of the universal constant pool, replacing a one byte offset with a two byte offset to address the constant (step 910). This can be accomplished by allocating another data area for storing the bytecodes. As the bytecodes are scanned, they are read into the new data area and any one byte offsets requiring replacement with two byte offsets are replaced during this copying process. The method block is then updated to reflect the new storage location for the bytecodes. The offset operands for bytecodes representing branching instructions are adjusted in accordance with the number of bytes (if any) added between the location of the branch bytecode and the branch target bytecode.

Likewise, the exception table for each class file will require adjustment if any of the methods in the class file reference constants in the second segment of the constant pool. The adjusted instructions referencing constants in the second segment of the constant pool will occupy more space than previously, thereby affecting the offsets in the exception table. Revised start and end offsets as well as handler offsets that are affected by the insertion of double length constant pool offsets are calculated and stored in the exception table (steps 916–918).

Next, a new method is created to handle static class initialization. Normally, when a class is dynamically loaded, a class initializer is run at the same time to initialize certain variables and the like associated with the class. Since the classes are preloaded in the method and system described herein, class initialization will not be performed. Therefore, the offline class loader has to create a method that will perform class initialization for the preloaded classes. However, a data flow analysis is performed first (steps 920–924) in order to determine the execution sequence for performing each class initializer. The sequence is important since one class may utilize data that is initialized in another class. If the correct sequence is not maintained, the static class initializer will produce incorrect results. Once the sequence is determined, a new method is created that will initialize each class in the sequence for those classes that are to be preloaded (step 926).

The linkage indicators are then inserted into the class block structures in order to flag which methods and field blocks are to be stored in a random access memory. The linker uses this information in order to create a separate address space for the methods and field blocks that are to be stored in the random access memory. The linker can presume that the absence of an indicator indicates that the methods and fields are to be stored in read-only memory. Alternatively, an additional indicator can be used to explicitly indicate those methods, class data structures, and fields that are to be stored in the read-only memory (step 928).

Lastly, the offline class loader outputs the universal constant pool, an updated class file containing the class data structures and the indicators specifying the memory storage requirements, as well a special boot time initiator (step 930).

Figure 12:
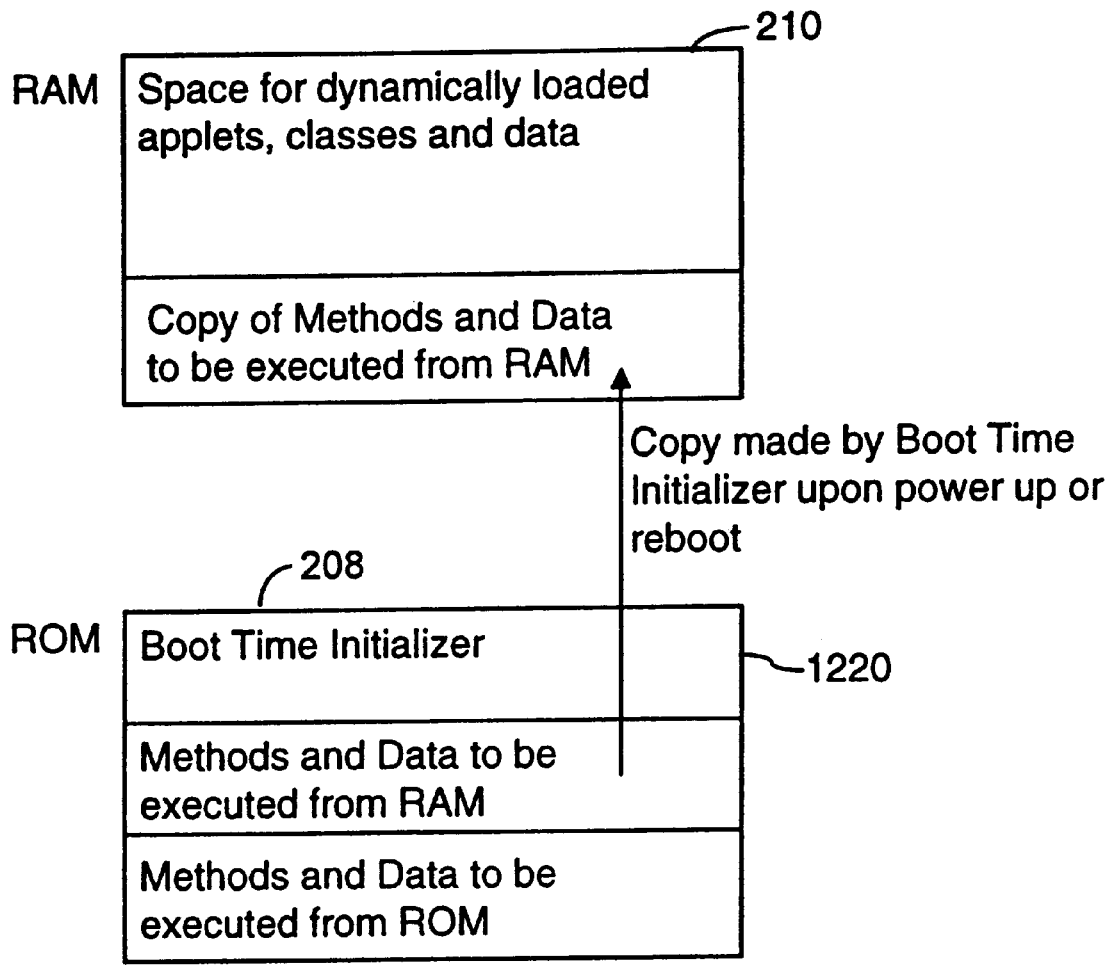
FIG. 12 is a block diagram showing the mapping of a preloaded application into read-only memory and random-access memory and indicating the loading of the portion of the methods and data mapped into random-access memory by a static class initializer.

Referring to FIG. 12, the preloadable executable module and boot time initiator 1220 are permanently stored in the read-only memory of a client computer. Each time the client computer is powered on or rebooted, the boot time initiator 1220 is automatically executed. Among other tasks, the boot time initiator copies all methods and data that must be resident in random access memory during execution to the random access memory locations assigned to them by the linker.

Although, the aforementioned system and method has been described with respect to executing a Java browser and support procedures for use in accessing HTML documents through the Internet, the method and system described herein is applicable to any Java application. Moreover, the Java application need not be run in a distributed environment, it can run in stand-alone mode executing in a client or server computer without importing new classes from external systems. In stand-alone mode, the application is partitioned into the two address spaces in order to satisfy the memory constraints of the particular computing environment.

Although the method and system described herein has been described with reference to the Java programming language it is applicable to computer systems using other object-oriented classes that utilize dynamic runtime loading of classes.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk The present invention is defined by the appended claims in light of their full scope of equivalence.

What is claimed is:

1. A computer program product, for use in conjunction with a computer system, the computer program product comprising a computer readable storage medium and a computer program mechanism embedded therein, the computer program mechanism comprising:

a preloaded module that includes data and at least one method that includes a plurality of instructions, a subset of the instructions including references to computer accessible methods; wherein the preloaded module is partitioned into a first submodule and a second submodule, each submodule including a plurality of instructions and data, the second submodule having a subset of the instructions and a subset of the data, the subset of instructions and subset of data including instructions and data that are modifiable during execution of the plurality of instructions; and an initialization module that, upon initialization of the computer system, stores the second submodule in a read and write-enabled random access memory device within the computer system.

2. The computer program product of claim 1, wherein the preloaded module includes a runtime class loader for loading classes of methods into the computer system for execution.

3. The computer program product of claim 2, wherein the preloaded module includes a browser module.

4. The computer program product of claim 3, wherein the preloaded module includes instructions for importing information-content data and computer-executable modules from devices other than the computer system and to store the imported data and the computer-executable modules stored in the read and write-enabled random access memory device.

5. The computer program product of claim 4, wherein the preloaded module includes instructions for invoking the class loader to load the imported computer-executable module prior to execution thereof.

6. The computer program product of claim 4, wherein the a computer readable storage medium is a read-only memory device.

7. The computer program product of claim 1, wherein the a computer readable storage medium is a read-only memory device.

* * * * *